US009966597B2

(12) United States Patent
Jung et al.

(10) Patent No.: US 9,966,597 B2
(45) Date of Patent: May 8, 2018

(54) METHOD OF MANUFACTURING JELLY ROLL-TYPE ELECTRODE ASSEMBLY AND METHOD OF MANUFACTURING JELLY ROLL-TYPE POLYMER SECONDARY BATTERY

(71) Applicant: LG Chem, Ltd., Seoul (KR)

(72) Inventors: Do-Hwa Jung, Daejeon (KR); In-Gu An, Daejeon (KR); Jae-Bin Chung, Daejeon (KR); Soon-Ho Ahn, Daejeon (KR); Dong-Myung Kim, Daejeon (KR)

(73) Assignee: LG Chem, Ltd. (KR)

( * ) Notice: Subject to any disclaimer, the term of this patent is extended or adjusted under 35 U.S.C. 154(b) by 416 days.

(21) Appl. No.: 14/496,302

(22) Filed: Sep. 25, 2014

(65) Prior Publication Data

US 2015/0026970 A1    Jan. 29, 2015

Related U.S. Application Data

(63) Continuation of application No. PCT/KR2014/001741, filed on Mar. 4, 2014.

(30) Foreign Application Priority Data

Mar. 4, 2013  (KR) .................. 10-2013-0022983

(51) Int. Cl.
*H01M 10/0587* (2010.01)
*H01M 4/1399* (2010.01)
(Continued)

(52) U.S. Cl.
CPC ........... *H01M 4/1399* (2013.01); *H01M 4/04* (2013.01); *H01M 10/02* (2013.01);
(Continued)

(58) Field of Classification Search
CPC .. H01M 4/1399; H01M 10/0587; H01M 4/04; H01M 10/02; H01M 10/0431;
(Continued)

(56) References Cited

U.S. PATENT DOCUMENTS 6,136,466 A * 10/2000 Takeuchi .......... H01M 10/0431
429/211
2002/0124949 A1 * 9/2002 Fukuda ................ B29C 65/02
156/251
(Continued)

FOREIGN PATENT DOCUMENTS

CN   101369674 A   2/2009
EP   0670605 A1   9/1995
(Continued)

OTHER PUBLICATIONS

Supplementary Partial Search Report from European Application No. 14759705.8, dated Nov. 12, 2015.
(Continued)

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

There are provided a method of manufacturing a jelly roll-type electrode assembly and a method of manufacturing a secondary battery using the electrode assembly. The method of manufacturing the electrode assembly includes notching a cathode and an anode, elongated in one direction, in a constant size and shape to form a plurality of electrode units, laminating the cathode and the anode with a separator disposed therebetween to form a unit cell, and winding the unit cell by bending the connection units so that the electrode units of the cathode and the anode overlap each other. In the manufacturing of the jelly roll-type electrode assem-
(Continued)

bly and the polymer secondary battery, whose production process can be easily simplified, a jelly roll-type electrode assembly and a polymer secondary battery, both of which exhibit excellent design flexibility, can be manufactured.

8 Claims, 1 Drawing Sheet

(51) Int. Cl.
  *H01M 4/04* (2006.01)
  *H01M 10/02* (2006.01)
  *H01M 10/04* (2006.01)
  H01M 10/052 (2010.01)
  H01M 10/0583 (2010.01)

(52) U.S. Cl.
  CPC ... *H01M 10/0431* (2013.01); *H01M 10/0445* (2013.01); *H01M 10/052* (2013.01); *H01M 10/0583* (2013.01); *H01M 10/0587* (2013.01); *Y10T 29/4921* (2015.01); *Y10T 29/49112* (2015.01); *Y10T 29/49211* (2015.01)

(58) Field of Classification Search
  CPC .......... H01M 10/052; H01M 10/0583; H01M 10/0445; Y02T 10/7011; Y10T 29/49112; Y10T 29/4921; Y10T 29/49211
  USPC ....................... 29/623.3, 877, 878
  See application file for complete search history.

(56) References Cited

U.S. PATENT DOCUMENTS

| | | | |
|---|---|---|---|
| 2003/0072993 A1* | 4/2003 | Kim | H01M 2/1653 429/94 |
| 2007/0154790 A1 | 7/2007 | Jeung et al. | |
| 2013/0280567 A1 | 10/2013 | Kwon et al. | |

FOREIGN PATENT DOCUMENTS

| | | |
|---|---|---|
| EP | 1339115 A1 | 8/2003 |
| JP | H08-037010 | 2/1996 |
| JP | 2002117900 A | 4/2002 |
| JP | 2003217562 A | 7/2003 |
| JP | 2008041404 | 2/2008 |
| JP | 2009522744 A | 6/2009 |
| JP | 2010-067443 A | 3/2010 |
| KR | 2002-0082729 A | 10/2002 |
| KR | 20030066960 A | 8/2003 |
| KR | 10-0567583 B1 | 4/2006 |
| KR | 2011-0000517 A | 1/2011 |

OTHER PUBLICATIONS

International Search Report of PCT/KR2014/001741 dated Jun. 25, 2014.
Office Action from Chinese Application No. 201480000926.9, dated Mar. 1, 2016.
Extended Search Report from European Application No. 14759705.8, dated Apr. 12, 2016.

* cited by examiner

METHOD OF MANUFACTURING JELLY ROLL-TYPE ELECTRODE ASSEMBLY AND METHOD OF MANUFACTURING JELLY ROLL-TYPE POLYMER SECONDARY BATTERY

CROSS-REFERENCE TO RELATED APPLICATIONS

This application claims the priorities of Korean Patent Application Nos. 10-2013-0022983 filed on Mar. 4, 2013, in the Korean Intellectual Property Office and the international application No. PCT/KR2014/001741 filed on Mar. 4, 2014, the disclosure of which is incorporated herein by reference.

BACKGROUND OF THE INVENTION

Field of the Invention

The present disclosure relates to a method of manufacturing a jelly roll-type electrode assembly and a method of manufacturing a polymer secondary battery including the electrode assembly, and more particularly, to a method of manufacturing a jelly roll-type electrode assembly allowing for improved design flexibility and a method of manufacturing a polymer secondary battery including the electrode assembly.

Description of the Related Art

In general, a jelly roll-type polymer battery is manufactured by laminating a cathode and an anode with a separator disposed therebetween and winding the cathode and anode laminate in a single direction. A schematic process of manufacturing such a jelly roll-type electrode assembly and a jelly roll-type electrode assembly obtained by the process are illustrated in FIG. 1.

In FIG. 1, a jelly roll-type electrode assembly 1 may be obtained by winding a plurality of electrodes in a single direction, unlike a method of manufacturing an electrode assembly by laminating a plurality of electrodes as a stack-type electrode assembly, or a stacking/folding type electrode assembly, which does not require a process of laminating the plurality of electrodes and a separator. Accordingly, this method has advantages in that the manufacturing process is relatively simpler than the other methods, which results in easy production.

However, when the electrode assembly 1 is manufactured as such a jelly roll type electrode assembly, two linear electrodes, that is, an anode 31 and a cathode 33, both of which generally have a rectangular shape elongated in a single direction, and a separator 50 are used, as illustrated in FIG. 1. Therefore, the jelly roll-type electrode assembly 1, obtained as described above by laminating the anode 31 and the cathode 33 with the separator 50 disposed therebetween and simply winding the anode 31 and the cathode 33, and a battery obtained using such an electrode assembly typically have a rectangular shape as illustrated in FIG. 1, which may restrict the shapes of batteries. As a result, a degree of design freedom may be significantly reduced, compared to stack-type or stacking/folding-type polymer batteries.

Korean Patent Publication No. 2002-0082729 discloses a method of manufacturing a button-type lithium battery in which a jelly roll type battery is manufactured by coupling circular electrode collector plates to a quadrilateral connection unit. However, the secondary battery provided in the patent document is limited to a button-type lithium battery. In particular, the patent document discloses that a separator is disposed between a cathode collector plate and an anode collector plate, but does not specifically describe the shape of the separator. Also, the patent document does not disclose specific contents regarding the shape of the separator corresponding to the shape of the collector plates.

Accordingly, a degree of design freedom may be limited when the quadrilateral separator is used, and when a separator having the same shape as the collector plate is used, the separator has to be processed to have the same shape as the collector plate. Additionally, when a separator is processed to have a specific shape, the separator should be realized in advance in a shape corresponding to the shape of an electrode plate. In this case, a certain degree of dimensional precision is required. In particular, the separator is typically a very thin film formed of a plastic material, and thus is not easily cat to have a predetermined shape, which results in difficulty in realizing a desired shape.

An aspect of the present disclosure may provide methods of manufacturing a jelly roll-type electrode assembly and a polymer secondary battery, both of which exhibit excellent design flexibility, in the manufacturing of the jelly roll-type electrode assembly and the polymer secondary battery, whose production process can easily be simplified.

An aspect of the present disclosure may also provide an effective method of processing the separator used in the manufacturing of the electrode assembly to correspond to the shape of the electrode assembly.

SUMMARY OF THE INVENTION

According to an aspect of the present disclosure, a method of manufacturing an electrode assembly may include a notching operation of notching a cathode and an anode, elongated in one direction, to have constant sizes and Shapes to form a plurality of electrode units, wherein the electrode units are electrically connected to each other by means of connection units formed at both ends of each of the electrode units, a laminating operation of laminating the cathode and the anode with a separator 50 disposed therebetween to form a unit cell, and a winding operation of winding the unit cell by bending the connection units so that the electrode units of the cathode and the anode overlap each other.

The method of manufacturing an electrode assembly according to an exemplary embodiment of the present disclosure may further include a separator bonding operation of bonding extra separators, shapes of which not corresponding to the shape of the electrode units, after the winding operation, to form a separator-bonded body, and a cutting operation of cutting the separator-bonded body.

In this case, the separator-bonded body may be formed by welding the separators, and the welding may be performed within a temperature of a glass transition temperature (Tg) of the separator ±20° C.

Also, the cutting operation may be performed by cutting the separators using a knife, a die, scissors, a laser beam or the like.

The connection unit may be formed of the same material as a collector plate of the electrode unit. In this case, the connection unit may be coated with the same electrode active material as the electrode units.

According to another aspect of the present disclosure, a method of manufacturing a secondary battery may include packaging the electrode assembly manufactured by the above-described method in a cell case.

The method of manufacturing a secondary battery according to an exemplary embodiment of the present disclosure may further include processing the cell case in a shape corresponding to a shape of the electrode assembly.

According to the present disclosure, the jelly roll-type electrode assembly may be realized in various shapes, thereby improving design flexibility of the secondary battery.

Further, the extra separators may be easily cut off to correspond to the shape of the manufactured electrode assembly.

DETAILED DESCRIPTION OF THE INVENTION

Figure 1:
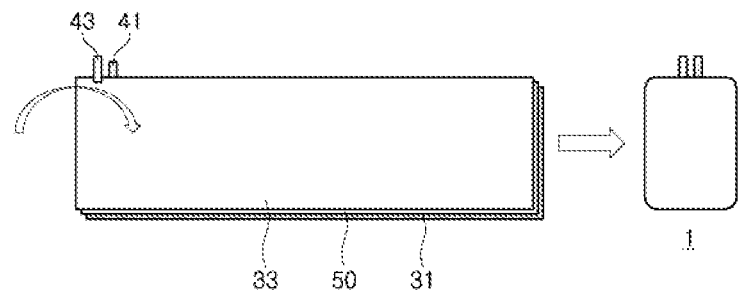
FIG. 1 is a schematic diagram showing a conventional method of manufacturing a jelly roll-type electrode assembly, and a top view of an electrode assembly obtained by the method.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

The present disclosure is directed to a method of manufacturing a jelly roll-type electrode assembly. Here, the present inventors have found that the design flexibility of batteries can be improved, since various shapes of the batteries can be realized in the manufacturing of an electrode assembly in a jelly roll type by notching the shape of an electrode plane on which a charging/discharging reaction of a battery takes place according to a desired shape.

The present disclosure provides a method of manufacturing a jelly roll-type electrode assembly by winding a laminate in a single direction. Here, the laminate is formed by laminating a single anode and a single cathode with a separator disposed, therebetween, wherein the anode includes an anode active material layer in which one surface or both surfaces of an anode collector plate are coated with an anode active material, and has an anode tab, and the cathode includes a cathode active material layer in which one surface or both surfaces of a cathode collector plate are coated with a cathode active material, and has a cathode tab. Such a method of manufacturing a jelly roll-type electrode assembly according to an exemplary embodiment of the present disclosure is schematically illustrated in FIG. 2.

Figure 2:
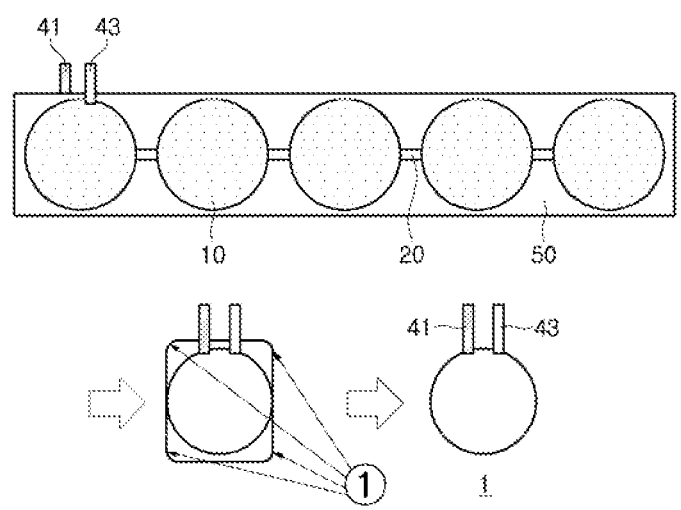
FIG. 2 is a schematic diagram showing a method of manufacturing a jelly roll-type electrode assembly having improved shape flexibility according to an exemplary embodiment of the present disclosure, and a top view of an electrode assembly obtained by the method.

Referring to FIG. 2, in the manufacturing of the electrode assembly 1 according to an exemplary embodiment of the present disclosure, each of the anode 31 and the cathodes 33 includes a plurality of electrode units 10 coated with an electrode active material to cause a charging/discharging reaction in batteries and connection units 20 configured to electrically couple the electrode units 10 to each other. The electrode units 10 and the connection units 20 may be formed by notching an electrode 31 or 33. When the electrode units 10 are formed by notching the electrode 31 or 33, the electrode 31 or 33 may be notched to form the connection unit 20 electrically coupling the electrode units 10 each other such that the electrode units 10 function as one electrode without any short circuit.

The electrode units 10 may be realized in various shapes according to the shape of a battery to be realized. For example, the electrode units 10 may be formed in a circular shape, as illustrated in FIG. 2, and may also be realized in various shapes such as quadrilateral and oval shapes.

Meanwhile, the connection units 20 serve to electrically couple the adjacent electrode units 10 to function as one electrode as a whole. In the manufacturing of the jelly roll-type electrode assembly 1, the connection units 20 are formed at lateral surfaces of the electrode units 10 so that the electrode units 10 can be folded at the connection units 20, but the positions of the connection units 20 are not particularly limited. In this case, the shape of the connection units 20 are not particularly limited, but the connection units 20 may be formed in various shapes.

Further, the width of the connection units 20 may be properly adjusted, as necessary. However, when the connection units 20 have an excessively large width, it is difficult to realize a desired shape of the electrode units 10. Upon winding, tension is applied to allow the electrodes to closely adhere to the separator 50. In this case, when the connection units 20 have an excessively small width, the connection units 20 may be broken by tension applied thereto during the winding. For example, the width of the connection units 20 may be in a range of 5 to 30% with respect to the length of the electrode units 10 on which the connection units 20 are disposed.

Meanwhile, the length of the connection units 20 is determined according to gaps between the electrode units 10, but the present disclosure is not limited thereto. However, since an electrode laminate has an increasing height from the inside to the outside in a winding direction, it is desirable to design the connection units 20 such that the length of the connection units 20 can gradually increase from the inside to the outside in consideration of this fact.

The anode 31 and the cathode 33 may have the same shapes as the electrode units 10 and the connection units 20, respectively. Since the jelly roll-type electrode assembly 1 is formed by laminating the anode 31 and the cathode 33 with the separator 50 disposed therebetween and winding the laminate of anode 31 and cathode 33 in one direction, the shapes of the electrode units 10 and the connection units 20 of the cathode 33 and the anode 31 may be the same at the corresponding electrodes, respectively.

An electrode including the electrode units 10 and the connection units 20 may be formed by notching the electrode in which one surface or both surfaces of a collector plate, elongated in a single direction, are coated with each electrode active material, leaving behind the connection units 20 to prevent the electrode units 10 from being detached from each other.

The notching may be performed without limitation as long as the electrode can be shaped to have the electrode units and the connection units. For example, the electrode may be formed using a stamping die. In this case, the shapes of the electrode units and the connection units may be the same as the cathode and the anode, respectively, as described above. Therefore, the notching may be performed on the cathode and the anode at the same time, and may also be performed using the same die.

When the electrode laminate is wound to manufacture a jelly roll-type electrode assembly, the electrode assembly may be manufactured by laminating the electrodes units and the connection units to be corresponded and then winding the laminate of electrodes units in one direction. In this case, the electrode laminate may be bent and wound at the connection units formed at both sides of each electrode unit. As a result, the electrode units may be laminated in a direction perpendicular to a plane to form a jelly roll-type electrode assembly in which the cathode, the separator and the anode are alternately laminated sequentially.

Meanwhile, the electrode units and connection units may be formed by notching from one collector plate, and thus may have the same material. In this case, the connection units may be an electroless portion not coated with an electrode active material. When the connection unit is formed as the electroless portion as described above, a short-circuit problem in the batteries caused by detachment of the electrode active material from the collector plate due to the bending of the connection units may be prevented. Also, an electrode active material may be coated on one surface or both surfaces of each of the connection units. When the connection units are coated with the electrode active material as described above, a charging/discharging reaction of a battery may be facilitated, which leads to an increase in batter capacity.

The above-described jelly roll-type electrode assembly provided in the present disclosure may be formed by laminating a separator, elongated in a single direction, on an interface between the cathode and the anode and winding the electrode laminate. Therefore, the separator used in the manufacturing of the jelly roll-type electrode assembly includes extra separators ① shapes of which not corresponding to the shape of the electrode units, as illustrated in FIG. 2. When there are such extra separators ①, a separate space in which the separator is accommodated may be required when the electrode assembly is introduced into a cell case. As a result, since it is difficult to realize a desired battery design, the extra separators should be removed. However, such extra separators may not easily cut off for removal, since the extra separators are formed of a soft material such as polyester and are very thin, which makes it difficult to cut the extra separators to correspond to the shape of the electrode units.

A cutting process may be easily performed on the extra separators by bonding the extra separators extruding outward the electrode units of the cathode and the anode to form a separator-bonded body and cutting the extra separators. One sheet of separator is not easily cut off, but, when several separator sheets are bonded to become relatively rigid, the separators may be more easily cut off.

The separator-bonded body may be produced, for example, using a method of welding separators by applying a temperature and a pressure to the separators, and the like, but the present disclosure is not limited thereto. In this case, the bonding temperature of the separators may be in a range of (Tg−20)° C. to (Tg+20)° C. (here "Tg" is a glass transition temperature of the separator) in consideration of bonding properties of the separators, but the present disclosure is not limited thereto.

The produced separator-bonded body may be cut in a shape corresponding to the shape of the electrode units. When the separators are formed of a polymer material, the polymer material may be softened at a certain temperature and pressure, and thus the separators may be bonded. Also, since the separators are bonded, at one position and cut off, all the separators may be cut to have the same shape through one cutting operation.

In this case, the cutting operation may be performed using a knife, a die, scissors, or a laser beam, but the present disclosure is not limited thereto.

In this case, the term "same shape" does not refer to only a shape completely corresponding to the shape of the electrode units of the anode and cathode, and may be used as meaning that only slight extra portion of the separators may remain.

A polymer secondary battery may be obtained by packaging the electrode assembly obtained thus in a cell case. In this case, the cell case may be a pouch-type case, and may be foamed in a shape corresponding to the shape of the electrode assembly packaged in the cell case.

Further, a battery pack including two or more secondary batteries may be obtained, and a device including at least one secondary battery may also be obtained. The device may be a cell phone, a portable computer, a smartphone, a smartpad, a netbook computer, a Light Electronic Vehicle (LEV), an electric oar, a hybrid electric vehicle, a plug-in hybrid electric vehicle, or a power storage system.

While exemplary embodiments have been shown and described above, it will be apparent to those skilled in the art that modifications and variations could be made without departing from the spirit and scope of the present disclosure as defined by the appended claims.

1: electrode assembly
10: electrode unit
20: connection unit
31: anode
33: cathode
41: anode tab
43: cathode tab
50: separator
①: extra separator

The invention claimed is:

1. A method of manufacturing an electrode assembly, comprising:
   a notching operation of notching a cathode and an anode, elongated in one direction, in a constant size and shape to form a plurality of electrode units, wherein the electrode units are electrically connected to each other by means of connection units formed at both ends of each of the electrode units;
   a laminating operation of laminating the cathode and the anode with a separator disposed therebetween to form a unit cell;
   a winding operation of winding the unit cell by bending the connection units so that the electrode units of the cathode and the anode overlap each other;
   a separator bonding operation of bonding extra separators, whose shape does not correspond to a shape of the electrode units, after the winding operation, to form a separator-bonded body; and
   a cutting operation of cutting the separator-bonded body to form a shape corresponding to the shape of the electrode units.

2. The method of claim 1, wherein the separator-bonded body is formed by welding the separators.

3. The method of claim 2, wherein the welding is performed within a temperature of a glass transition temperature (Tg) of the separator ±20° C.

4. The method of claim 1, wherein the cutting operation is performed by cutting the separators using a knife, a die, scissors, or a laser beam.

5. The method of claim 1, wherein the connection unit is formed of the same material as a collector plate of the electrode unit.

6. The method of claim 5, wherein the connection unit is coated with the same electrode active material as the electrode units.

7. A method of manufacturing a secondary battery, comprising packaging the electrode assembly manufactured by the method defined in claim 1 in a cell case.

8. The method of claim 7, further comprising processing the cell case in a shape corresponding to a shape of the electrode assembly.

* * * * *